United States Patent
Chen

(10) Patent No.: US 10,429,701 B2
(45) Date of Patent: Oct. 1, 2019

(54) DISPLAY PANEL AND LCD PANEL AND LCD APPARATUS USING THE SAME

(71) Applicants: HKC Corporation Limited, Shenzhen, Guangdong (CN); Chongqing HKC Optoelectronics Technology Co., Ltd., Chongqing (CN)

(72) Inventor: Yu-Jen Chen, Chongqing (CN)

(73) Assignees: HKC Corporation Limited, Shenzhen, Guangdong (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 20 days.

(21) Appl. No.: 15/556,079

(22) PCT Filed: May 31, 2017

(86) PCT No.: PCT/CN2017/086636
§ 371 (c)(1),
(2) Date: Sep. 6, 2017

(87) PCT Pub. No.: WO2018/120646
PCT Pub. Date: Jul. 5, 2018

(65) Prior Publication Data
US 2018/0275466 A1    Sep. 27, 2018

(51) Int. Cl.
*G02F 1/1343* (2006.01)
*G02F 1/1333* (2006.01)

(52) U.S. Cl.
CPC .... *G02F 1/134309* (2013.01); *G02F 1/13439* (2013.01); *G02F 1/133371* (2013.01); *G02F 2001/134345* (2013.01); *G02F 2201/122* (2013.01); *G02F 2201/50* (2013.01)

(58) Field of Classification Search
CPC .................................................. G02F 1/134309
See application file for complete search history.

(56) References Cited

U.S. PATENT DOCUMENTS

2011/0279745 A1    11/2011   Yamamoto et al.
2013/0154911 A1*    6/2013   Chen ................ G02F 1/134336
                                                                345/87

(Continued)

FOREIGN PATENT DOCUMENTS

| CN | 101089692 A | 12/2007 |
| CN | 101510022 A | 8/2009 |
| CN | 102289108 A | 12/2011 |

(Continued)

OTHER PUBLICATIONS

International Search Report based on International Application No. PCT/CN2017/086636; dated Sep. 27, 2017.

*Primary Examiner* — Edmond C Lau
(74) *Attorney, Agent, or Firm* — Muncy, Geissler, Olds & Lowe, P.C.

(57) ABSTRACT

This application provides a display panel and an LCD panel and an LCD apparatus using the same. The display panel comprises a first substrate; a plurality of pixel units, formed on the first substrate; a protective layer, formed on the first substrate, and a transparent electrode layer formed on the protective layer, wherein the protective layer has different thicknesses in each of the pixel units so that a plurality of transparent regions are formed in each of the pixel units.

11 Claims, 11 Drawing Sheets

(56) References Cited

U.S. PATENT DOCUMENTS

2015/0248038 A1* 9/2015 Zhang ............... G02F 1/133514
                                                              257/390
2016/0216566 A1* 7/2016 Park .................. G02F 1/133753

FOREIGN PATENT DOCUMENTS

| CN | 203259680 U | 10/2013 |
|----|----|----|
| CN | 104049418 A | 9/2014 |
| CN | 105938281 A | 9/2016 |
| CN | 106597731 A | 4/2017 |
| CN | 106873217 A | 6/2017 |
| CN | 106873261 A | 6/2017 |
| CN | 106980200 A | 7/2017 |
| WO | WO-2014/002982 A1 | 1/2014 |

* cited by examiner

DISPLAY PANEL AND LCD PANEL AND LCD APPARATUS USING THE SAME

BACKGROUND

Technical Field

This application relates to a display panel and an LCD panel and an LCD apparatus using the same, and in particular, to a display panel having a protective layer with different thicknesses and an LCD panel and an LCD apparatus using the same.

Related Art

In recent years, with the development of science and technologies, various display panels, for example, liquid crystal displays (LCD) or electroluminescence (EL) display devices have been widely applied to flat panel displays. The LCD is used as an example. Most LCDs are backlight LCDs including an LCD panel and a backlight module. The LCD panel includes two transparent substrates and liquid crystals sealed between the substrates.

The LCD panel usually includes a color filter (CF), a thin film transistor array substrate (TFT Array Substrate), and a liquid crystal layer (LC Layer) disposed between the two substrates. A working principle is controlling rotation of liquid crystal molecules of the LC layer by applying a drive voltage to the two glass substrates, so as to refract light from the backlight module to generate an image.

An LCD of a vertical alignment (VA) mode includes, for example, a patterned vertical alignment (PVA) LCD or a multi-domain vertical alignment (MVA) LCD device. The PVA LCD achieves a wide-angle view by using a fringing field effect and a compensation plate. The MVA LCD device divides one pixel into a plurality of regions, and makes, by using a protrusion or a particular pattern structure, liquid crystal molecules in different regions tilt towards different directions, to achieve a wide-angle view and improve a penetration rate.

In an MVA mode, a current mainstream is mostly dividing a pixel region into a bright region and a dark region. Therefore, two types of V-T features may be mixed in optical representation. In addition, an area ratio of the bright region to the dark region is properly adjusted. Therefore, a problem of grayscale washout under a large visual angle can be effectively suppressed.

SUMMARY

To resolve the foregoing technical problem, an objective of this application is to provide a display panel having a protective layer with different thicknesses, and an LCD panel and an LCD apparatus using the same to resolve a color shift problem of a display panel. In addition, an opening rate of a pixel design may be effectively increased.

One of objectives of this application is to provide a display panel, comprising:
a first substrate;
a plurality of pixel units, formed on the first substrate;
a protective layer, formed on the first substrate, wherein the protective layer has different thicknesses in each of the pixel units so that at least two transparent regions having different thicknesses are formed in each of the pixel units; and
a transparent electrode layer, formed on the transparent regions having different thicknesses of the protective layer.

In some embodiments, the protective layer has a first thickness and a second thickness, and a thickness difference between the first thickness and the second thickness is equal to or greater than 1 um.

In some embodiments, each of the pixel units has a plurality of regions with different penetration rates.

In some embodiments, each of the pixel units comprises a first transparent region comprising four main transparent regions, a second transparent region comprising four secondary transparent regions, and a third transparent region comprising four tertiary transparent regions.

In some embodiments, the plurality of regions with different penetration rates are classified into at least three types of topography depths with different gradients and a pixel structure of the plurality of regions is divided into an inner-layer rhombus, a middle-layer rhombus, and an outer-layer triangle according to the at least three types of topography depths with different gradients, the plurality of regions are covered by the transparent electrode layer, and a slit design is reserved on the transparent electrode layer.

In some embodiments, the plurality of regions with different penetration rates are classified into at least three types of topography depths with different gradients and a pixel structure of the plurality of regions is divided into an inner-layer rectangle, a middle-layer rectangle, and an outer-layer rectangle according to the at least three types of topography depths with different gradients, the plurality of regions are covered by the transparent electrode layer, and a slit design is reserved on the transparent electrode layer.

In some embodiments, the protective layer has an exposed region exposing the first substrate, and a part of the transparent electrode layer is forming in the exposed region.

One of the objectives of this application is to provide an LCD panel, comprising:
a first substrate;
a second substrate;
an LC layer formed between the two substrates;
a plurality of pixel units, formed on the first substrate;
a protective layer, formed on the first substrate, wherein the protective layer has different thicknesses in each of the pixel units so that at least two transparent regions having different thicknesses are formed in each of the pixel units and each of the pixel units has a plurality of regions with different penetration rates; and
a transparent electrode layer, formed on the transparent regions having different thicknesses of the protective layer;
wherein the protective layer has a first thickness and a second thickness, and a thickness difference between the first thickness and the second thickness is equal to or greater than 1 um;
wherein the plurality of regions with different penetration rates are classified into at least three types of topography depths with different gradients and the plurality of regions are covered by the transparent electrode layer, and a slit design is reserved on the transparent electrode layer;
wherein the protective layer has an exposed region exposing the first substrate, and a part of the transparent electrode layer is formed in the exposed region;
wherein the LC layer formed between the two substrates has at least three types of optical path differences.

In an embodiment of this application, the display apparatus further comprises an active switch, used to drive an entire pixel unit.

Another objective of this application is to provide an LCD apparatus, comprising:

a backlight module; and
a display panel, comprising,
a first substrate;
a plurality of pixel units, formed on the first substrate;
a protective layer, formed on the first substrate, wherein the protective layer has different thicknesses in each of the pixel units so that at least two transparent regions having different thicknesses are formed in each of the pixel units; and
a transparent electrode layer, formed on the transparent regions having different thicknesses of the protective layer.

By means of this application, a color shift problem of an LCD panel can be effectively resolved, and a color washout under a large visual angle can be improved.

DETAILED DESCRIPTION

Figure 1A:
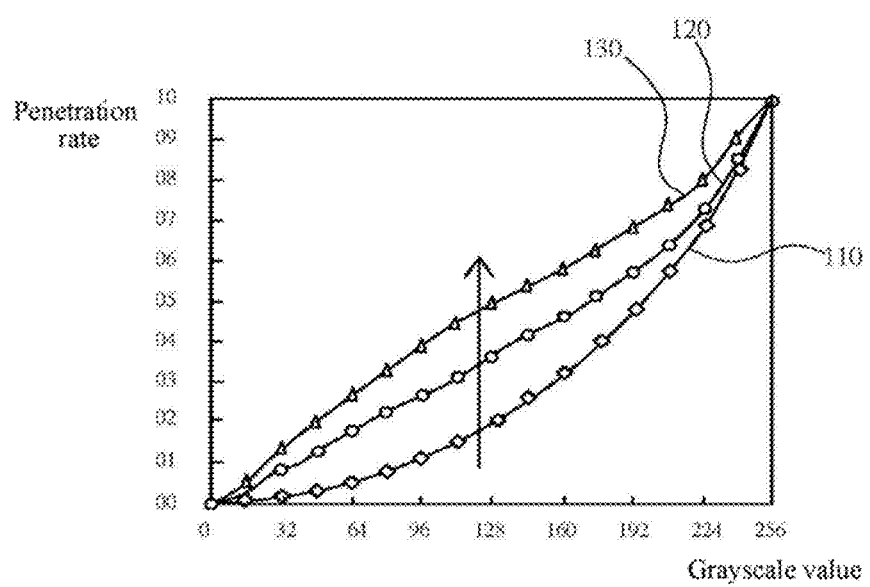
FIG. 1a shows penetration rate-grayscale value curves corresponding to color shift angles when a vertical alignment LCD device is viewed at a 0° visual angle, a 45° visual angle, and a 60° visual angle according to an embodiment of this application.

Reference accompanying drawings are described in the following embodiments, and are used to show particular embodiments that this application is applicable to for implementation. Direction terms mentioned in this application, for example, "up", "down", "front", "rear", "left", "right", "inside", "outside", and "side", are merely directions in the reference accompanying drawings. Therefore, the used direction terms are used to describe and understand this application, but not intended to limit this application.

The accompanying drawings and the specification are essentially exemplary instead of restrictive. In the drawings, units having similar structures are represented by same numbers. In addition, for ease of understanding and description, the size and thickness of each component shown in the accompanying drawings are random. However, this application is not limited thereto.

In the accompanying drawings, for the purpose of clearness, the thicknesses of a layer, a film, a panel, a region, and the like are exaggerated. In the accompanying drawings, for ease of understanding and description, the thicknesses of some layers and regions are exaggerated. It should be understood that when a component of, for example, a layer, a film, a region, or a base is referred to as "on" another component, the component may be directly on the another component, or there may be an intermediate component.

In addition, in the specification, unless explicitly described to the contrary, the term "include" is understood as including the component but not to exclude any other components. Moreover, in the specification, "on" means above or under a target component, but does not necessarily mean on the top based on the direction of gravity.

To further describe the technical measures and functions used in this application to achieve the predetermined invention objectives, specific implementations, structures, features, and functions of a display panel and an LCD panel to which the display panel is applied that are provided in this application are described in detail below with reference to the accompanying drawings and preferred embodiments.

A display panel in this application may include: a first substrate; a plurality of pixel units, formed on the first substrate; a protective layer, formed on the first substrate, where the protective layer has different thicknesses in each of the pixel units, and accordingly at least two transparent layers having different thicknesses are formed in each of the pixel units; and a transparent electrode layer, formed on the transparent layers having different thicknesses of the protective layer.

An LCD apparatus using the display panel in this application may include a backlight module and an LCD panel. The LCD panel may include: a TFT substrate, a CF substrate, and an LC layer formed between the two substrates.

In an embodiment, the LCD panel in this application may be a curved-surface display panel, and the LCD apparatus in this application may be a curved-surface display apparatus.

In an embodiment, a TFT and a CF in this application may be formed on a same substrate.

FIG. 1a shows penetration rate-grayscale value curves corresponding to color shift angles when a vertical alignment LCD device is viewed at a 0° visual angle, a 45° visual angle, and a 60° visual angle. Referring to FIG. 1a, the 0° color shift visual angle corresponds to a penetration rate-grayscale value curve 110, the 45° color shift visual angle corresponds to a penetration rate-grayscale value curve 120, and the 60° color shift visual angle corresponds to a penetration rate-grayscale value curve 130. Therefore, a larger color shift visual angle indicates a higher brightness penetration rate for a same grayscale value.

Figure 1B:
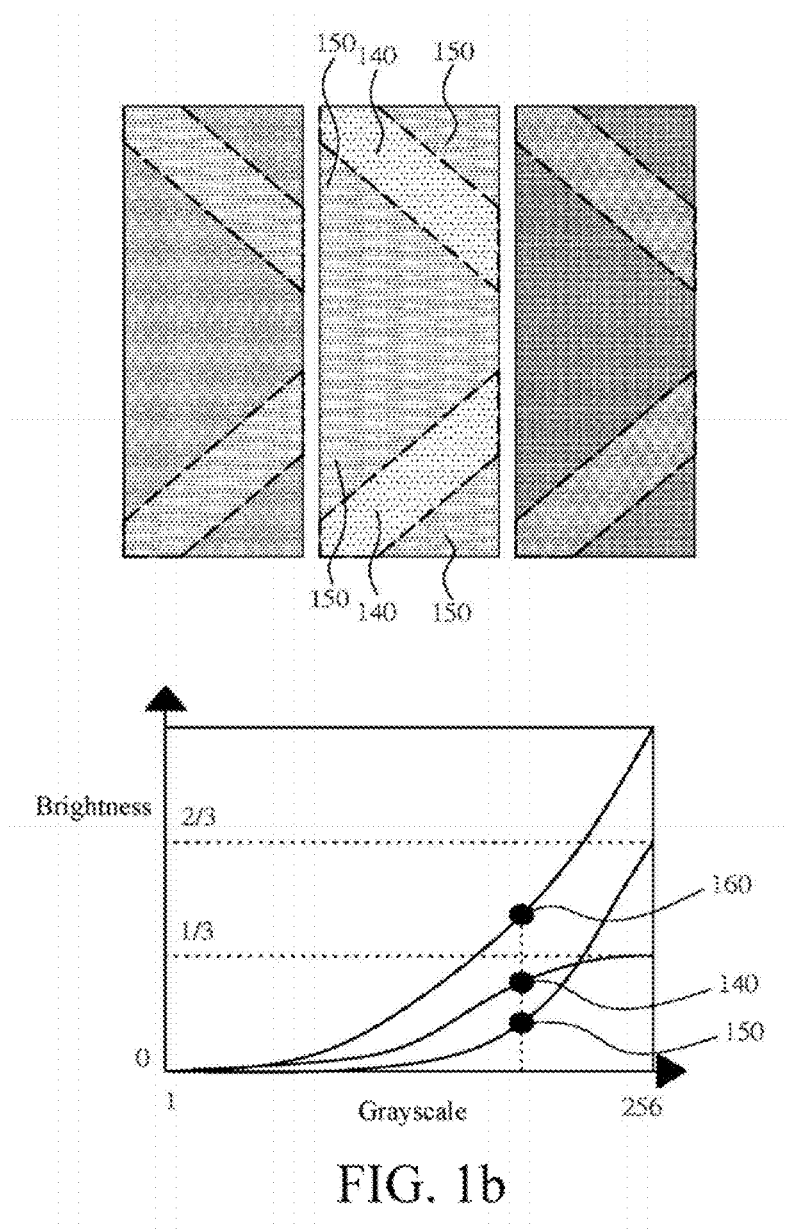
FIG. 1b shows brightness-grayscale curves corresponding to mixture of two color shift angles for improvement according to an embodiment of this application.

FIG. 1b shows brightness-grayscale curves corresponding to mixture of two color shift angles for improvement. Referring to FIG. 1b, in an MVA mode, a pixel region may be divided into a bright region and a dark region. Therefore, two types of V-T features may be mixed in optical representation. In addition, an area ratio of the bright region to the dark region is properly adjusted. Therefore, a problem of grayscale washout can be effectively suppressed. Bright-region pixels 140 and dark-region pixels 150 are mixed into pixels 160 in a brightness-grayscale figure.

Figure 2:
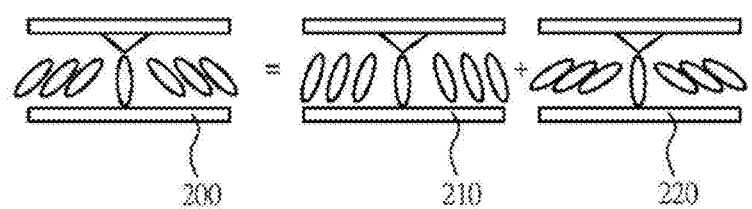
FIG. 2 shows models of mixing low color shift regions according to an embodiment of this application.

FIG. 2 shows models of mixing low color shift regions. Referring to FIG. 2, a main principle of a common low color shift technology is dividing conventional four regions into eight regions by means of voltage division or an extra drive. Therefore, an effect of multi-range compensation is achieved under a large visual angle. For example, a sub low color shift region 210 and a main low color shift region 220 are mixed into a low color shift region 200.

Figure 3:
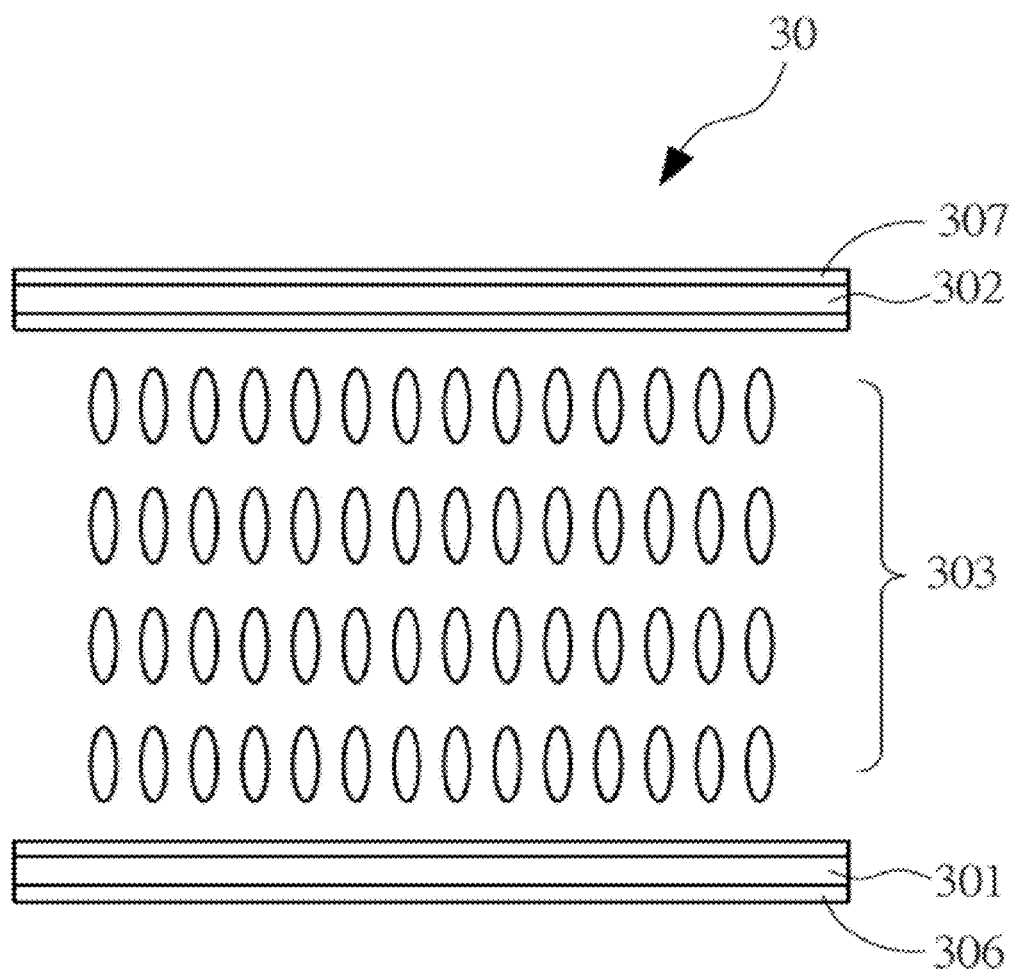
FIG. 3 is a schematic diagram of an LCD panel according to an embodiment of this application.
Figure 3A:
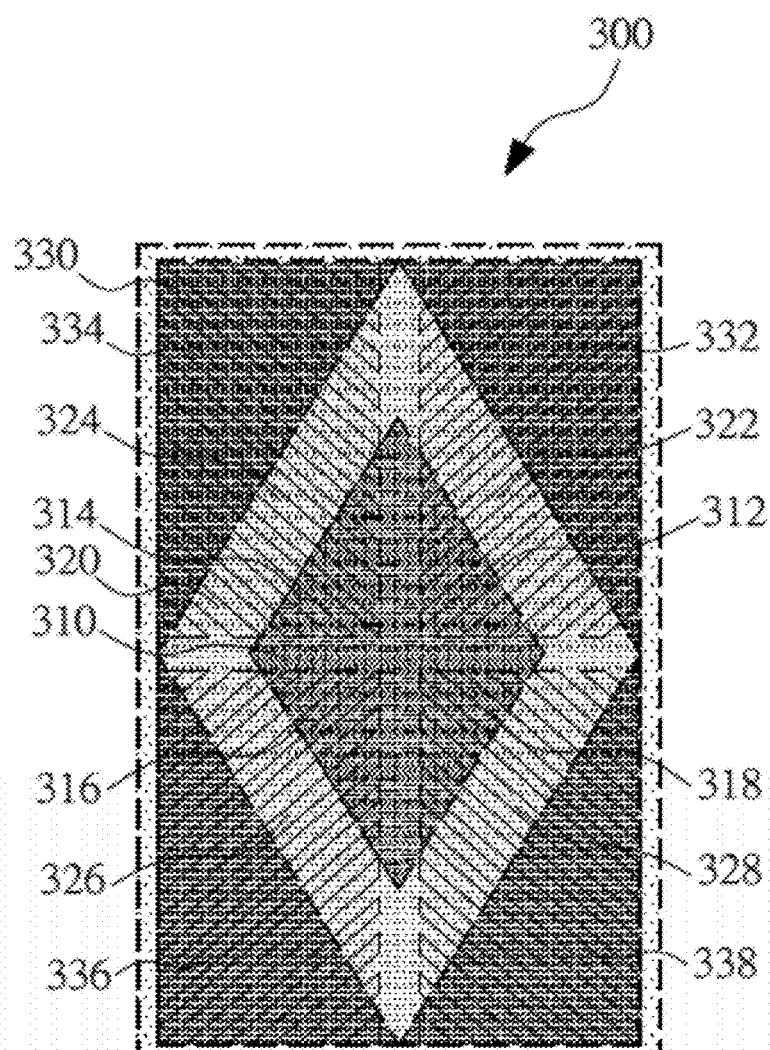
FIG. 3a is a schematic diagram of 12 pixel regions of a pixel structure of an LCD panel according to an embodiment of this application.

FIG. 3 is a schematic diagram of an LCD panel 30 according to an embodiment of this application. FIG. 3a is a schematic diagram of 12 pixel regions of a pixel structure of an LCD panel according to an embodiment of this application. Referring to FIG. 3 and FIG. 3a, in an embodiment of this application, the LCD panel 30 includes: a first substrate 301 (for example, a TFT substrate); a second substrate 302 (for example, a CF substrate), disposed opposite to the first substrate 301; and an LC layer 303, disposed between the first substrate 301 and the second substrate 302. In addition, the LCD panel 30 further includes a pixel structure for improving color shift, disposed between the first substrate and the second substrate (for example, on a surface of the first substrate); and a plurality of pixel units 300. The pixel unit 300 includes three regions: a first transparent region 310, a second transparent region 320, and a third transparent region 330, and effects of pixel transparent regions in the pixel unit 300 are distinguished according to different optical path differences and a particular area ratio. The pixel unit 300 is disposed between the first substrate 301 and the second substrate 302. The LCD panel 30 further includes a first polarizer 306 disposed on an outer surface of the first substrate 301 and a second polarizer 307 disposed on an outer surface of the second substrate 302. Polarization directions of the first polarizer 306 and the second polarizer 307 are parallel to each other.

In an embodiment of this application, a display apparatus in this application includes a backlight module, and an LCD panel 30 including: a first substrate 301 (for example, a TFT substrate); a second substrate 302 (for example, a CF substrate), disposed opposite to the first substrate 301; and an LC layer 303, disposed between the first substrate 301 and the second substrate 302. In addition, the display apparatus further includes: a pixel structure of the LCD panel, disposed on the first substrate and the second substrate (for example, on a surface of the first substrate); and a plurality of pixel units 300. The pixel unit 300 includes three regions: a first transparent region 310, a second transparent region 320, and a third transparent region 330, and effects of pixel transparent regions in the pixel unit 300 are distinguished according to different optical path differences and a particular area ratio. The pixel unit 300 is disposed between the first substrate 301 and the second substrate 302. The display apparatus further includes a first polarizer 306 disposed on an outer surface of the first substrate 301 and a second polarizer 307 disposed on an outer surface of the second substrate 302. Polarization directions of the first polarizer 306 and the second polarizer 307 are parallel to each other.

In this embodiment of this application, each of the pixel units 300 may have a plurality of regions with different penetration rates.

Referring to FIG. 3a, in an embodiment of this application, the pixel structure includes the pixel units 300. The pixel unit 300 includes the three regions: the first transparent region 310 (including four main transparent regions 312, 314, 316, and 318), the second transparent region 320 (including four secondary transparent regions 322, 324, 326, and 328), and the third transparent region 330 (including four tertiary transparent regions 332, 334, 336, and 338). Effects of pixel transparent regions distinguished according to different depths and a particular area ratio.

Figure 3B:
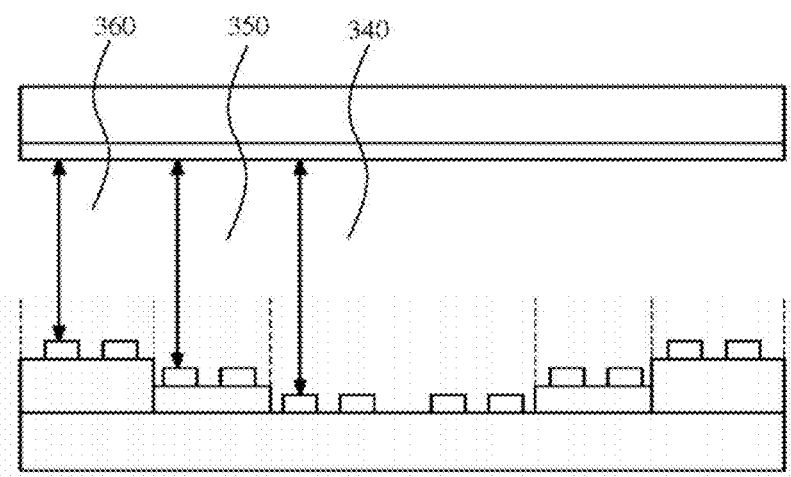
FIG. 3b shows optical path differences between three types of LC layers of a pixel structure of an LCD panel according to an embodiment of this application.

FIG. 3b shows optical path differences between three types of LC layers of a pixel structure of an LCD panel according to an embodiment of this application. In an embodiment of this application, the pixel unit 300 may equivalently divide pixels into 12 regions by using an optical path difference Δnd (including three optical path differences 340, 350, and 360) and factors such as different gradients.

Figure 4A:
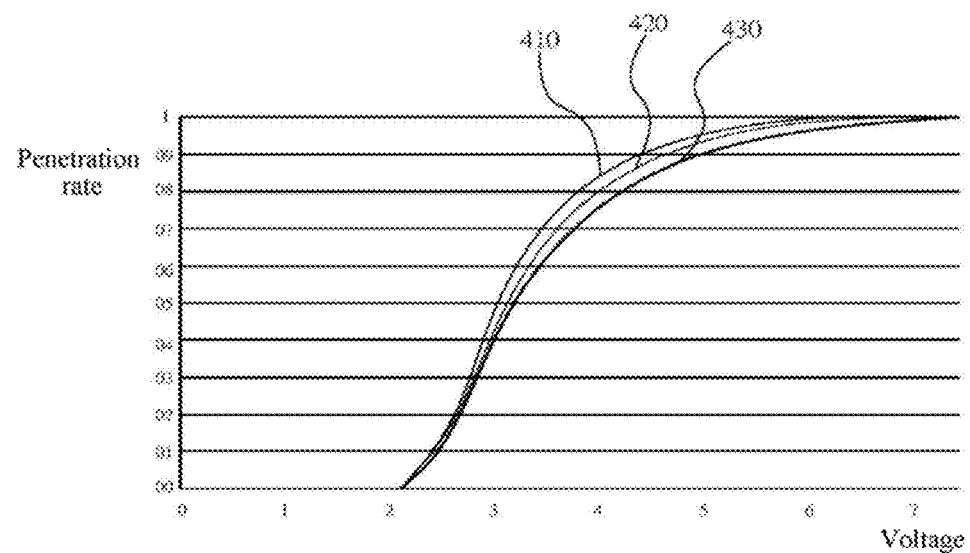
FIG. 4a shows three types of gamma curves illustrated by using penetration rate-voltage curves according to an embodiment of this application.

FIG. 4a shows three types of gamma curves illustrated by using penetration rate-voltage curves according to an embodiment of this application. Referring to FIG. 4a, a 3.6 μm LC layer cell gap corresponds to a penetration rate-voltage value curve 410, a 3.9 μm LC layer cell gap corresponds to a penetration rate-voltage value curve 420, and a 4.2 μm LC layer cell gap corresponds to a penetration rate-voltage value curve 430.

Figure 4B:
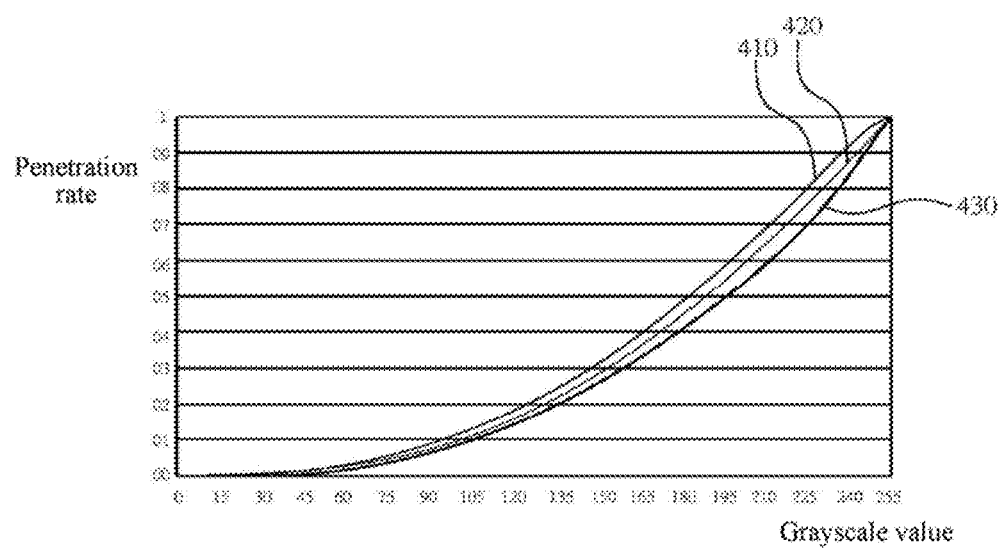
FIG. 4b shows three types of gamma curves illustrated by using penetration rate-grayscale value curves according to an embodiment of this application.

FIG. 4b shows three types of gamma curves illustrated by using penetration rate-grayscale value curves according to an embodiment of this application. Referring to FIG. 4a, a 3.6 μm LC layer cell gap corresponds to a penetration rate-grayscale value curve 410, a 3.9 μm LC layer cell gap corresponds to a penetration rate-grayscale value curve 420, and a 4.2 μm LC layer cell gap corresponds to a penetration rate-grayscale value curve 430.

Figure 5:
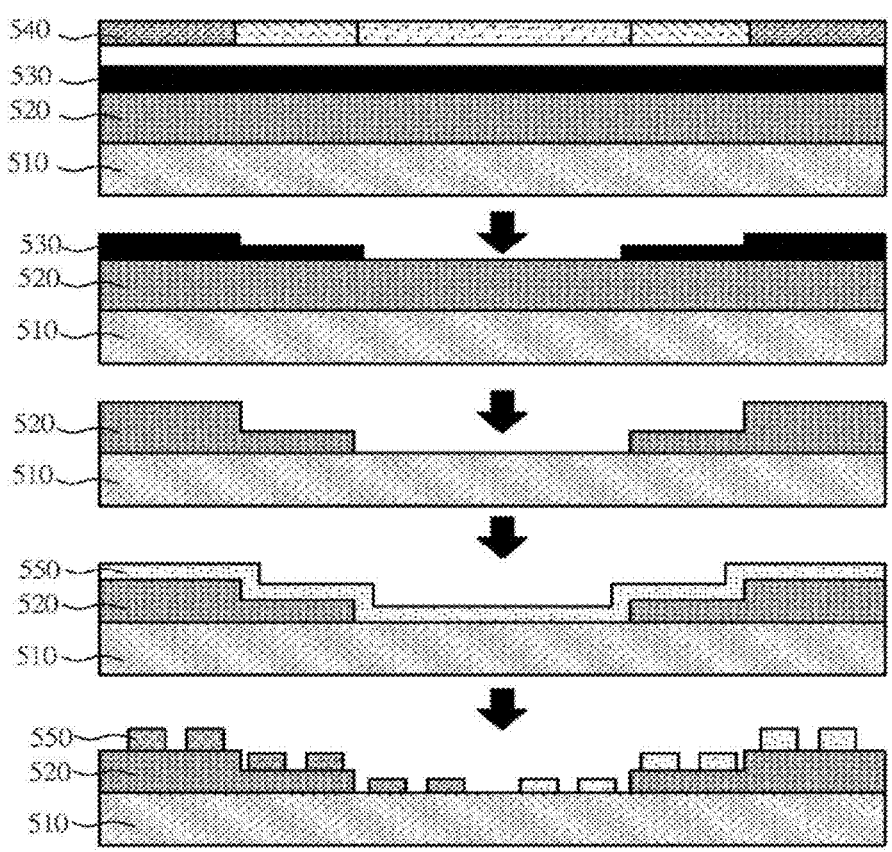
FIG. 5 is a schematic diagram of a pixel structure manufactured by using a half-tone process and having a surface with gradients according to an embodiment of this application.

FIG. 5 is a schematic diagram of a pixel structure manufactured by using a half-tone process and having a surface with gradients according to this application. Referring to FIG. 5, in an embodiment of this application, an etching process of the protective layer is changed by using a half-tone process. In addition, a pixel distinguishing effect is achieved by using topographies with different gradients in a liquid crystal box. Therefore, a conventionally used voltage division manner is replaced. For example, a first substrate has a four-layer structure, including: a transparent substrate (SB) layer 510, a protective (Passivation) layer 520, a photoresist (PR) material layer 530, and a transparent electrode layer 550 (for example, indium tin oxide, ITO). A film-forming step, an exposing step, a developing step, an etching step, and a film-stripping step are required. This procedure needs to be repeated for five times before a substrate is completed. In the film-forming step, a thin film of a required material (the protective layer 520, the light resistance material layer 530, and the transparent electrode layer 550) is extended on the transparent substrate (SB) layer 510. In the exposing step, a required pattern of a light resistor 530 is developed on the light resistor 530 by using a mask 540. In the developing step, a part of the light resistor 530 on the pattern of the light resistor 530 in the previous stage is reserved. In the etching step, a required pattern is etched on the substrate 510 having the pattern of the light resistor 530. In the film-stripping step, the light resistor 530 covering the pattern is removed from the substrate 510 after the required pattern has been etched thereon, and a subsequent process is performed. Therefore, the protective layer 520 may have different thicknesses, so that at least two transparent layers (or transparent regions) having different thicknesses are formed in each of the pixel units.

As shown in FIG. 5, the method for manufacturing a display panel in this application may include the following steps:

providing a first substrate 510, where the first substrate has a plurality of pixel units 300;

forming a protective layer 520 on the first substrate 510;

patterning the protective layer 520, so that the protective layer 520 has different thicknesses, and at least two transparent regions having different thicknesses are formed in each of the pixel units 300; and forming a transparent electrode layer 550 on the patterned protective layer.

In some embodiments, after the transparent electrode layer 550 is formed, the transparent electrode layer 550 may be patterned, so that the patterned transparent electrode layer 550 has a slit design.

In some embodiments, as shown in FIG. 5, the protective layer 520 has a first thickness and a second thickness, and a thickness difference between the first thickness and the second thickness is equal to or greater than 1 um.

In some embodiments, as shown in FIG. 5, the patterned protective layer 520 may have an exposed region exposing the first substrate 510, and a part of the transparent electrode layer 550 is formed in the exposed region.

Figure 6:
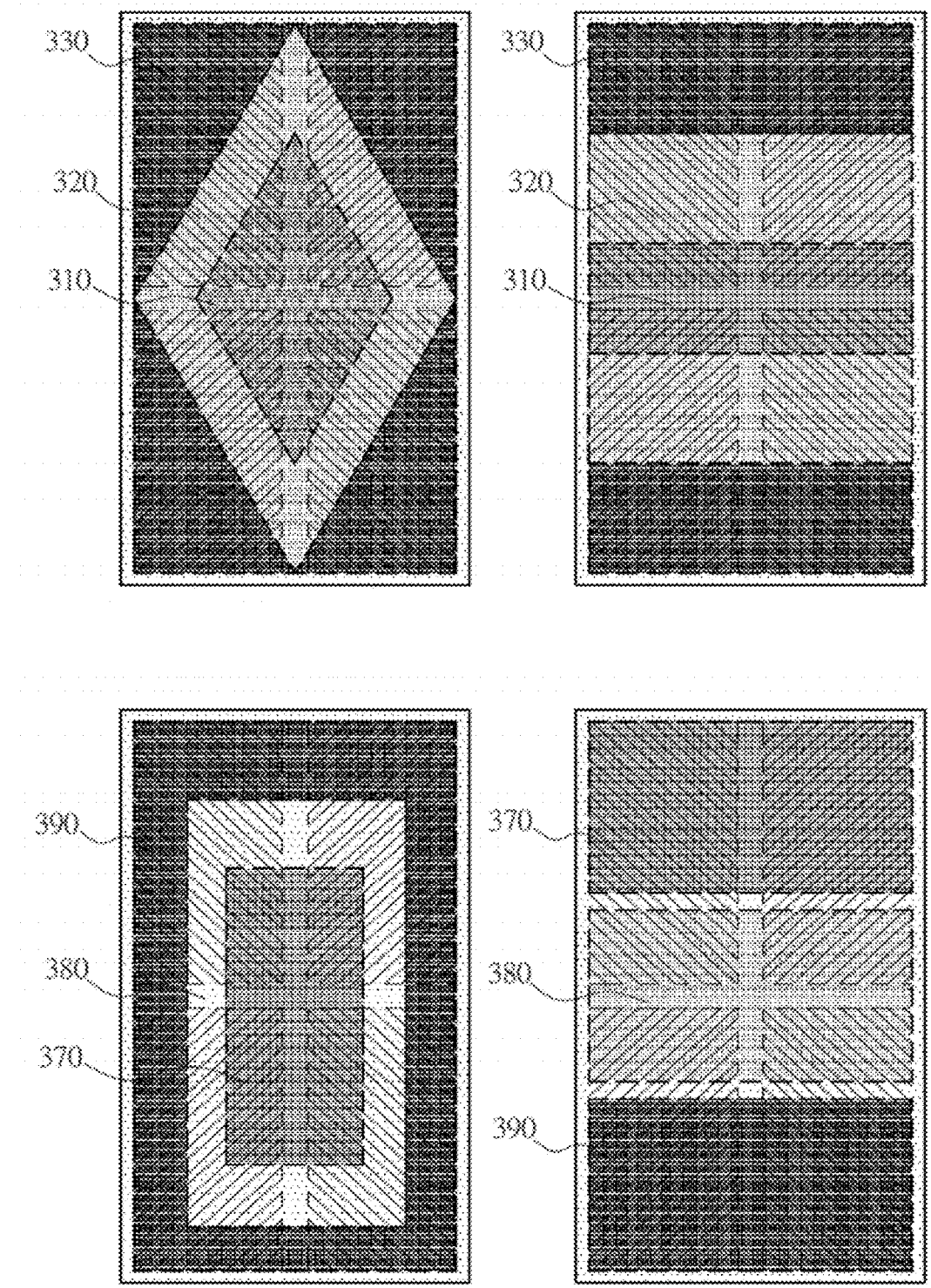
FIG. 6 is a schematic diagram of 12 regions formed by using three types of optical path differences according to an embodiment of this application.

FIG. 6 is a schematic diagram of 12 regions formed by using three types of optical path differences according to an embodiment of this application. Referring to FIG. 6, in an embodiment of this application, the 12 pixel regions are classified into three types of topography depths with different gradients. A pixel structure of the 12 pixel regions is divided into an inner-layer rhombus 310, a middle-layer rhombus 320, and an outer-layer triangle 330 according to the three types of topography depths with different gradients, the 12 pixel regions are covered by the transparent electrode layer, and a slit design is reserved on the transparent electrode layer.

Figure 7:
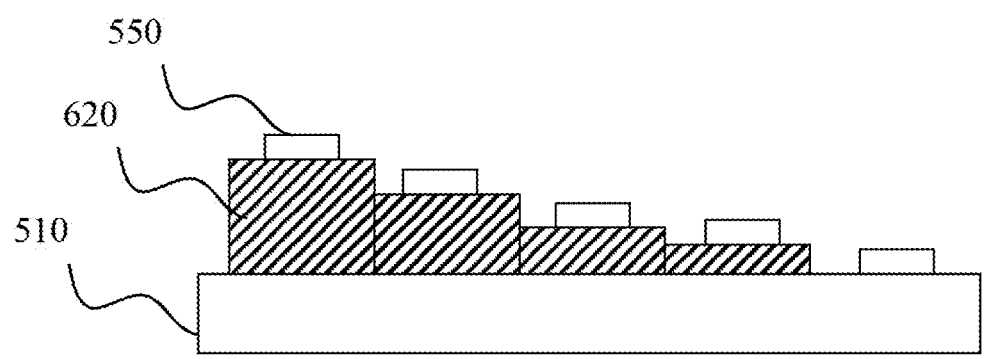
FIG. 7 is a schematic diagram of a mask and a protective layer according to an embodiment of this application.

FIG. 7 is a schematic diagram of a protective layer 620 according to an embodiment of this application. Referring to FIG. 7, in an embodiment of this application, the protective layer 620 may have at least three different thicknesses, such as four different thicknesses. The transparent electrode layer 550 may be formed on the protective layer 620 having different thicknesses so that more transparent regions (optical path differences) may be formed.

In an embodiment of this application, the 12 pixel regions are classified into three types of topography depths with different gradients. A pixel structure of 12 pixel regions is divided into an inner-layer rectangle, a middle-layer rectangle, and an outer-layer rectangle (370, 380, and 390) according to the three types of topography depths with different gradients, the 12 pixel regions are covered by the transparent electrode layer, and a slit design is reserved on the transparent electrode layer.

In this embodiment of this application, by designing a protective layer with different thicknesses, in each of the pixel units 300, overall pixels may be driven by using only one active switch (for example, a TFT), and an opening rate of a pixel design is increased.

A beneficial effect of this application is that a color shift problem of an LCD panel can be effectively resolved, and a color washout under a large visual angle can be improved.

"In some embodiments", "in various embodiments", and the like are repeatedly used. They usually do not refer to a same embodiment; but they may refer to a same embodiment. Terms such as "contain", "have", and "include" are synonyms, unless the context requires otherwise.

Descriptions above are merely preferred embodiments of this application, and are not intended to limit this application. Although this application has been disclosed above in forms of preferred embodiments, the embodiments are not intended to limit this application. A person skilled in the art can make some equivalent variations, alterations or modifications to the above disclosed technical content without departing from the scope of the technical solutions of the above disclosed technical content to obtain equivalent embodiments. Any simple alteration, equivalent change or modification made to the foregoing embodiments according to the technical essence of this application without departing from the content of the technical solutions of this application shall fall within the scope of the technical solutions of this application.

What is claimed is:

1. A display panel, comprising:
a first substrate;
a plurality of pixel units, farmed on the first substrate;
a protective layer, formed on the first substrate, wherein the protective layer has different thicknesses in each of the pixel units so that at least two transparent regions having different thicknesses are formed in each of the pixel unit; and
a transparent electrode layer, formed on the transparent regions having different thicknesses of the protective layer,
wherein each of the pixel units has a plurality of regions with different penetration rates,
wherein the plurality of regions with different penetration rates are classified into at least three types of topography depths with different gradients and a pixel structure of the plurality of regions is divided into an inner-layer rectangle, a middle-layer rectangle, and an outer-layer triangle or rectangle according to the at least three types of topography depths with different gradients, the plurality of regions are covered by the transparent electrode layer, and a slit design is reserved on the transparent electrode layer.

2. The display panel according to claim 1, wherein the protective layer has a first thickness and a second thickness, and a thickness difference between the first thickness and the second thickness is equal to or greater than 1 um.

3. The display panel according to claim 1, wherein each of the pixel units comprises a first transparent region comprising four main transparent regions, a second transparent region comprising four secondary transparent regions, and a third transparent region comprising four tertiary transparent regions.

4. The display panel according to claim 1, wherein the inner-layer rectangle is an inner-layer rhombus and the middle-layer rectangle is a middle-layer rhombus.

5. The display panel according to claim 1, wherein the protective layer has an exposed region exposing the first substrate, and a part of the transparent electrode layer is formed in the exposed region.

6. An LCD panel, comprising:
a first substrate;
a second substrate;
an LC layer formed between the two substrates;
a plurality of pixel units, formed on the first substrate;
a protective layer, formed on the first substrate, wherein the protective layer has different thicknesses in each of the pixel units so that at least two transparent regions having different thicknesses are formed in each of the pixel units and each of the pixel units has a plurality of regions with different penetration rates; and
a transparent electrode layer, formed on the transparent regions having different thicknesses of the protective layer;
wherein the protective layer has a first thickness and a second thickness, and a thickness difference between the first thickness and the second thickness is equal to or greater than 1 um;
wherein the plurality of regions with different penetration rates are classified into at least three types of topography depths with different gradients and the plurality of regions are covered by the transparent electrode layer, and a slit design is reserved on the transparent electrode layer;

wherein the protective layer has an exposed region exposing the first substrate, and a part of the transparent electrode layer is formed in the exposed region;

wherein the LC layer formed between the two substrates has at least three types of optical path differences, wherein each of the pixel units has a plurality of regions with different penetration rates, wherein the plurality of regions with different penetration rates are classified into at least three types of topography depths with different gradients and a pixel structure of the plurality of regions is divided into an inner-layer rectangle, a middle-layer rectangle, and an outer-layer triangle or rectangle according to the at least three types of topography depths with different gradients, the plurality of regions are covered by the transparent electrode layer, and a slit design is reserved on the transparent electrode layer.

7. An LCD apparatus, comprising:
a backlight module; and
a display panel, comprising,
a first substrate;
a plurality of pixel units, formed on the first substrate;
a protective layer, formed on the first substrate, wherein the protective layer has different thicknesses in each of the pixel units so that at least two transparent regions having different thicknesses are formed in each of the pixel units; and
a transparent electrode layer, formed on the transparent regions having different thicknesses of the protective layer, wherein each of the pixel units has a plurality of regions with different penetration rates, wherein the plurality of regions with different penetration rates are classified into at least three types of topography depths with different gradients and a pixel structure of the plurality of regions is divided into an inner-layer rectangle, a middle-layer rectangle, and an outer-layer triangle or rectangle according to the at least three types of topography depths with different gradients, the plurality of regions are covered by the transparent electrode layer, and a slit design is reserved on the transparent electrode layer.

8. The LCD apparatus according to claim 7, wherein the protective layer has a first thickness and a second thickness, and a thickness difference between the first thickness and the second thickness is equal to or greater than 1 um.

9. The LCD apparatus according to claim 7, wherein each of the pixel units comprises a first transparent region comprising four main transparent regions, a second transparent region comprising four secondary transparent regions, and a third transparent region comprising four tertiary transparent regions.

10. The LCD apparatus according to claim 8, wherein the inner-layer rectangle is an inner-layer rhombus and the middle-layer rectangle is a middle-layer rhombus.

11. The LCD apparatus according to claim 7, wherein the protective layer has an exposed region exposing the first substrate, and a part of the transparent electrode layer is formed in the exposed region.

* * * * *